United States Patent
Yamashita et al.

[11] Patent Number: 6,156,132
[45] Date of Patent: Dec. 5, 2000

[54] SOLDER ALLOYS

[75] Inventors: Mitsuo Yamashita; Shinji Tada; Kunio Shiokawa, all of Kawasaki, Japan

[73] Assignee: Fuji Electric Co., Ltd., Kawasaki, Japan

[21] Appl. No.: 09/244,034

[22] Filed: Feb. 4, 1999

[30]     Foreign Application Priority Data

Feb. 5, 1998  [JP]  Japan ................... 10-024899
Jul. 1, 1998  [JP]  Japan ................... 10-186534

[51] Int. Cl.$^7$ ................................................. B23K 35/22
[52] U.S. Cl. ................ 148/400; 148/442; 420/557; 420/561; 420/562; 420/577; 420/589
[58] Field of Search ................................. 148/442, 400; 420/557, 561, 562, 577, 589

[56]     References Cited

FOREIGN PATENT DOCUMENTS

| | | |
|---|---|---|
| 715927 | 6/1996 | European Pat. Off. . |
| 08150493 | 11/1996 | Japan . |
| 9712719 | 4/1997 | WIPO . |
| 9743081 | 11/1997 | WIPO . |

*Primary Examiner*—Sikyin Ip
*Attorney, Agent, or Firm*—Venable; Robert J. Frank

[57]     ABSTRACT

Lead-free alloys of the present invention includes bismuth in the amount of 30 to 58% by weight and one of the following first to fourth compositions in addition to tin as a main component. In the first composition, germanium is present in the amount of 0.1 or less % by weight. In the second composition, silver is present in the amount of 5% by weight or less and antimony is present in the amount of 5% by weight or less in addition to 0.1% by weight or less of germanium of silver. In the third composition, nickel and copper are included, preferably 0.2 or less % by weight or less of nickel and 1% by weight of copper. In the fourth composition, at least one selected from the group of 5 or less % by weight of silver, 5 or less % by weight of antimony, and 0.1 or less % by weight of germanium in addition to 0.2 or less % by weight of nickel and 1 or less % by weight of copper. Accordingly, the solder alloys of the present invention can be provided as lead-free and low-fusing solder alloys having good ductility, heat resistance, and wettability, compared with the conventional one.

6 Claims, 5 Drawing Sheets

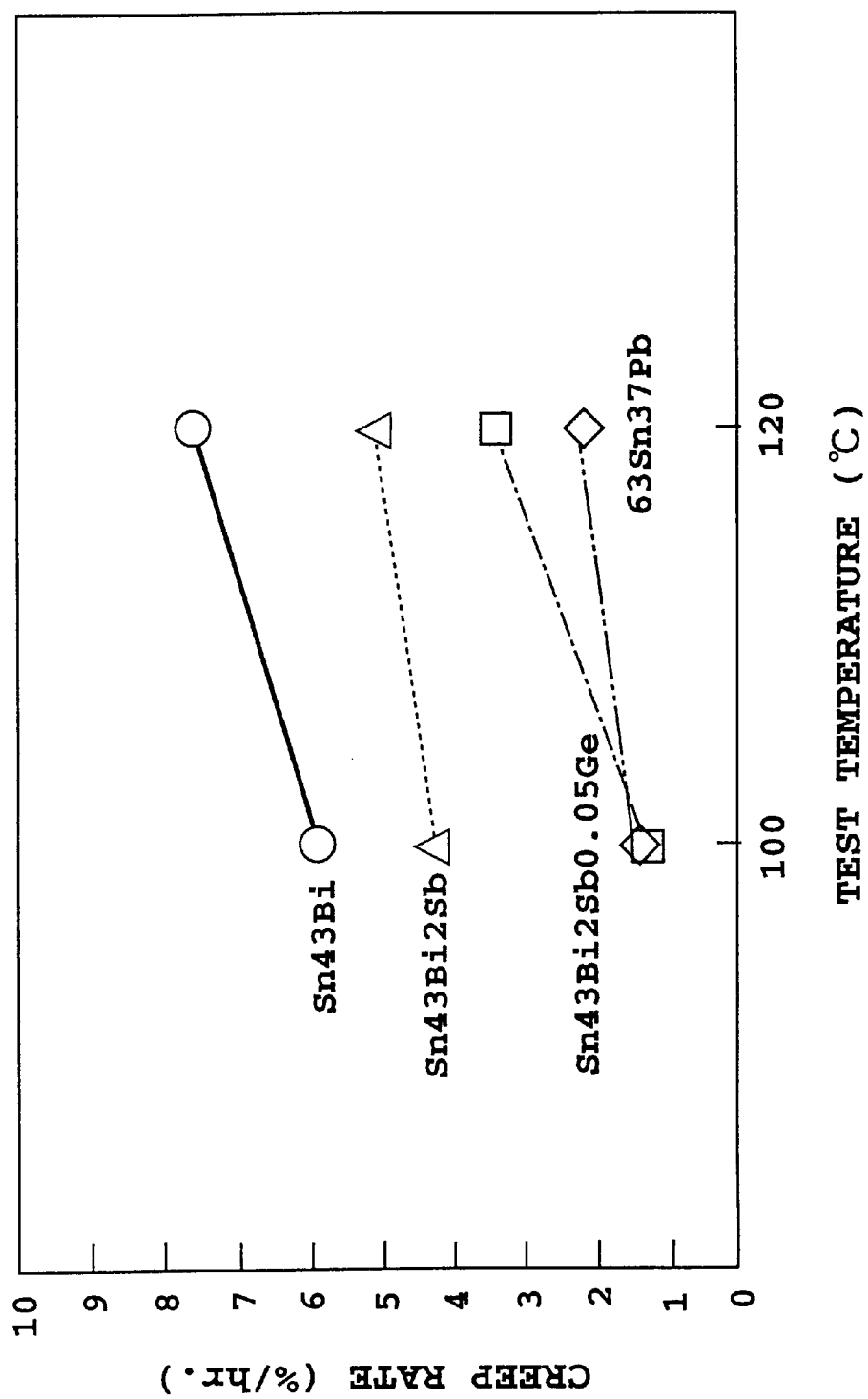

SOLDER ALLOYS

CROSS REFERENCE TO RELATED APPLICATIONS

This application is based on Japanese Patent Application No. 10-024899 filed Feb. 5, 1998 and Japanese Patent Application No. 10-186534 filed Jul. 1, 1998, the contents of which are incorporated herein by reference.

BACKGROUND OF THE INVENTION

1. Field of the Invention

The present invention relates to solder alloys to be used in a solder joint between metallic parts of electronic equipment, especially to lead (Pb)-free solder alloys for avoiding the environmental or health effects of Pb.

2. Description of the Related Art

Heretofore, solders have been used to join metallic parts, such as electrical wiring in an assembly line of electrical equipment or the like. For the soldering process, a solder alloy should have excellent characteristics of wettability, ductility, thermal fatigue strength, corrosion resistance, and so on. In addition, consideration must be given to environmental pollution, so that the solder alloy should be prepared without using Pb. Regarding the health effects of Pb, for example, Pb in any form shows internal accumulative toxicity in mammal. Therefore, public concerns regarding Pb include air pollution, waste treatment in the lead smelting process, and accumulation in the interior of body of babies and pregnant women due to exposure to the air and contamination of foods and the like.

The conventional solder alloys include tin (Sn)-lead (Pb), tin (Sn)-silver (Ag), tin (Sn)-antimony (Sb), and tin (Sn)-bismuth (Bi) alloys. Among them, for example, a typical alloy known as 63Sn-37Pb (having a eutectic temperature of 183° C.) contains 37% by weight of Pb based on the total amount of its composition and thus its use is not preferred because the of environmental effects of Pb.

Accordingly and for the following additional reasons, there is a need for providing a Pb-free solder alloy with a fluxing temperature of about 180° C. First, the fluxing temperature is important because two or more solder alloys with different soldering temperatures may be used in two or more soldering steps for manufacturing intricate equipment. Second, there is also the need for insuring the reliability of semiconductor parts in consideration of thermal cycle resistance at a peak temperature of about 125° C.

However each of the Pb-free alloys available to substitute for the Sn—Pb alloy has a comparatively high fluxing temperature. For example, the Sn—Sb alloy has a fluxing temperature of 232 to 245° C. In addition, the Sn—Ag alloy has a eutectic temperature of 221 C. A solder alloy of Sn7.5Bi2Ag0.5Cu, which is one of the Sn—Bi solders, has a fluxing temperature of 200 to 220° C. and requires a soldering temperature of 240 to 250° C. Like the solder alloy of Sn7.5Bi2Ag0.5Cu, one that contains several percent of Bi is characterized by its low ductility in addition to the following problems. For example, the first problem is its poor processability and strength. The second problem is that a solid/liquid-coexisting region where a liquidus line and a solidus line exist together is broadened. Therefore, a delamination (i.e., a lift-off phenomenon) of soldered parts may occur as a result of uneven distribution of Bi when two parts are bonded together.

A tin (Sn)-indium (In) alloy prepared by a Sn-based alloy composition with an addition of In has been studied as a Pb-free solder alloy having a low fluxing temperature. The Sn—In alloy has a eutectic point of 118° C., while a bismuth (Bi)-indium (In) alloy provided as another Pb-free solder alloy having a lower fluxing temperature has a eutectic point of 75° C. However, heat-resisting temperatures of these Pb-free alloys are too low to be used in practice.

SUMMARY OF THE INVENTION

A purpose of the present invention is to provide a Pb-free solder alloy having a low fluxing temperature and showing excellent characteristics of heat resistance and wettability in addition to low melting point and good ductility.

In the first aspect of the present invention, a lead-free solder alloy is provided, the alloy comprising:

tin as a main component of an alloy composition where bismuth is present in the amount of 30 to 58% by weight, and germanium is present in the amount of 0.1% by weight or less, based on the total amount of the alloy composition.

Here, a lead-free solder alloy may further comprise at least one component selected from the group consisting of:

silver in the amount of 5 or less % by weight; and antimony in the amount of 5 or less % by weight, based on the total amount of the alloy composition.

In the second aspect of the present invention, a lead-free solder alloy is provided, the alloy comprising comprising:

tin as a main component of an alloy composition in which predetermined amounts of nickel and copper are added in addition to bismuth in the amount of 30 to 58% by weight based on the total amount of the alloy composition.

Here, the amount of the nickel may be in the amount of 0.2 or less percent by weight and the amount of the copper may be in the amount of 1% by weight, or less based on the total amount of the alloy composition.

A lead-free solder alloy may further comprise at least one component selected from the group consisting of:

silver in the amount of 5 or less % by weight;

antimony in the amount of 5 or less % by weight; and germanium in the amount of 0.1 or less % by weight, based on the total amount of the alloy composition.

The above and other objects, effects, features and advantages of the present invention will become more apparent from the following description of the preferred embodiments disclosed herein taken in conjunction with the accompanying drawings.

BRIEF DESCRIPTION OF THE DRAWINGS

FIG. 5 is a graphical representation of the thermal dependency of a creep rate at temperatures of 100° C. and 120° C. for a tin-bismuth (Sn—Bi) type alloy (Bi-content: 43% by weight) of the present invention in addition to the characteristics of a tin-lead (Sn—Pb) alloy.

DETAILED DESCRIPTION OF THE PREFERRED EMBODIMENTS

Lead-free solder alloys of the present invention can be obtained by fusing each of raw materials selected from Sn, Bi, Sb, Ag, Ge, Ni, and Cu as necessary in an electric furnace, respectively. The methods of fusing the raw materials are well known in the art, so that the methods will be omitted from the following discussion in the interest of simplicity. In the following embodiments, four alloy compositions will be described in detail. Each of these compositions basically comprises tin as a primary component and 30 to 58% by weight of bismuth based on the total amount thereof. Thus, each of them further comprises the following components in addition to the above basic components. In the first composition, germanium is present in the amount of 0.1 or less % by weight. In the second composition, silver is present in the amount of 5% by weight or less and antimony is present in the amount of 5 % by weight or less in addition to 0.1% by weight or less of germanium. In the third composition, nickel and copper are included, preferably 0.2 or less % by weight of nickel and 1% by weight or less of copper. In the fourth composition, at least one selected from the group of 5 or less % by weight of silver, 5 or less % by weight of antimony, and 0.1 or less % by weight of germanium in addition to 0.2 or less % by weight of nickel and 1 or less % by weight of copper. Accordingly, the solder alloys of the present invention can be provided as lead-free and low-fusing solder alloys having good ductility, heat resistance, and wettability, compared with the conventional solder alloy.

Figure 1:
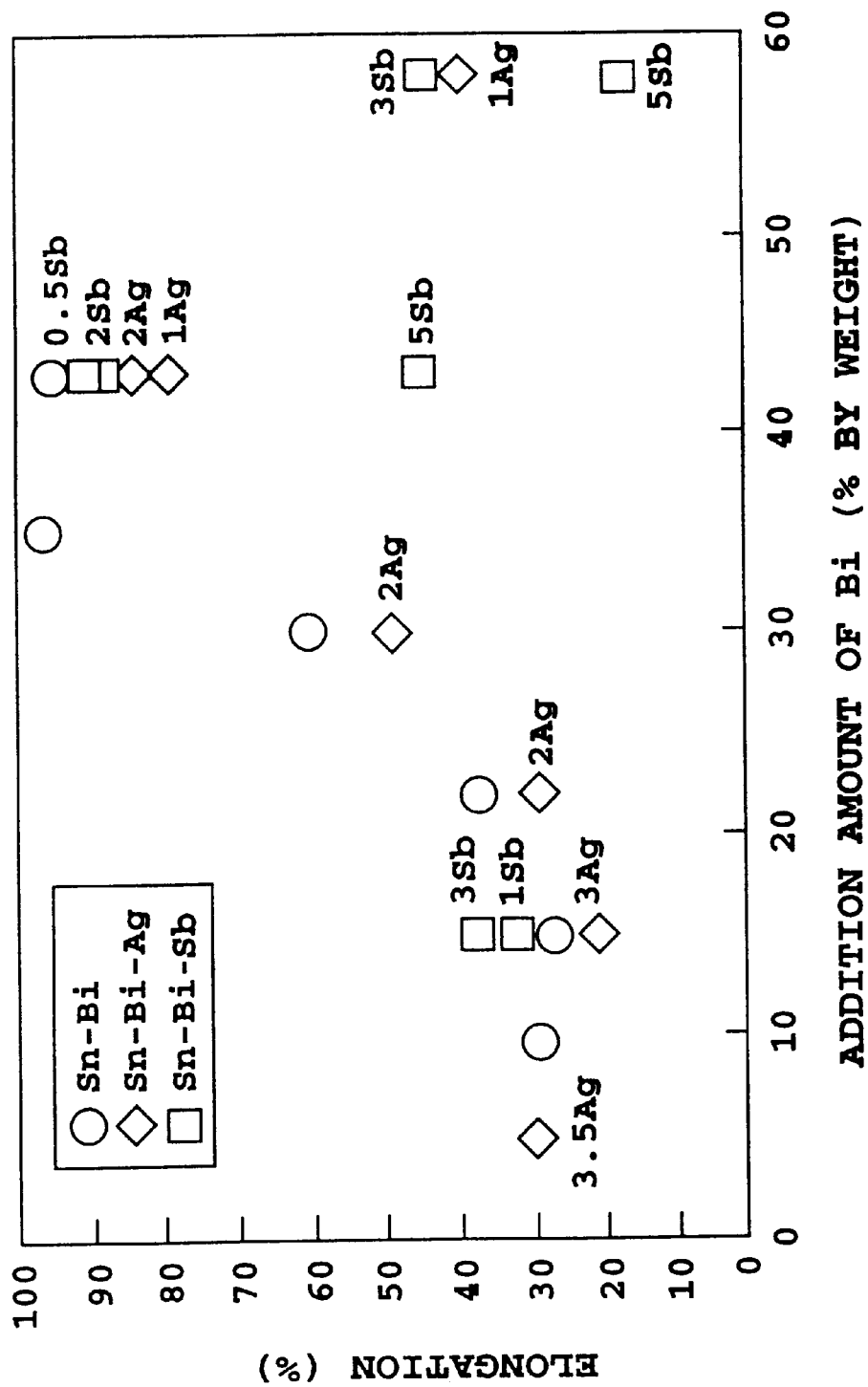
FIG. 1 is a graph showing the dependence of an elongation (%) of Sn—Bi alloy of the present invention on the addition amount of Bi (% by weight).

FIG. 1 is a graphical representation of the Bi-content (wt %) dependence of elongation percentage (%) of the Sn—Bi type alloys in accordance with the present invention.

In the figure, each circle denotes a plot of Sn—Bi alloy, each diamond denotes a plot of Sn—Bi—Ag alloy, and each square denotes a plot of Sn—Bi—Sb alloy. A strain rate at the elongation measurement is 0.2 percent per second. The ductility of the Sn—Bi alloy initially increases with the addition of Bi and then peaks. After exceeding its peak, the ductility of the Sn—Bi alloy decreases to the eutectic composition (Bi 58%). A fusing point of the eutectic composition is 139° C. 50 to 90% elongation of the Sn—Bi alloy is observed when the Bi content is in the range of 30 to 50% by weight. Considering the fact that an elongation percentage of the Sn—Ag alloy (3.5% silver) is in the range of 20 to 30% and an elongation percentage of Sn7.5Bi2Ag0.5Cu (fluxing temperature: about 200° C.) which is one of the Pb-free Sn—Bi type alloy is 10%, the above elongation percentage of the Sn—Bi alloy with the Bi-content of 30 to 50% is adequately large as much as that of Sn—Pb alloy. The ductility of the Sn—Bi—Ag alloy and Sn—Bi—Sb alloy are each lower than that of the Sn—Bi when the Bi content is in the range of 30 to 58%. In this case, however, it is still enough to provide a perfect solder joint.

Figure 2:
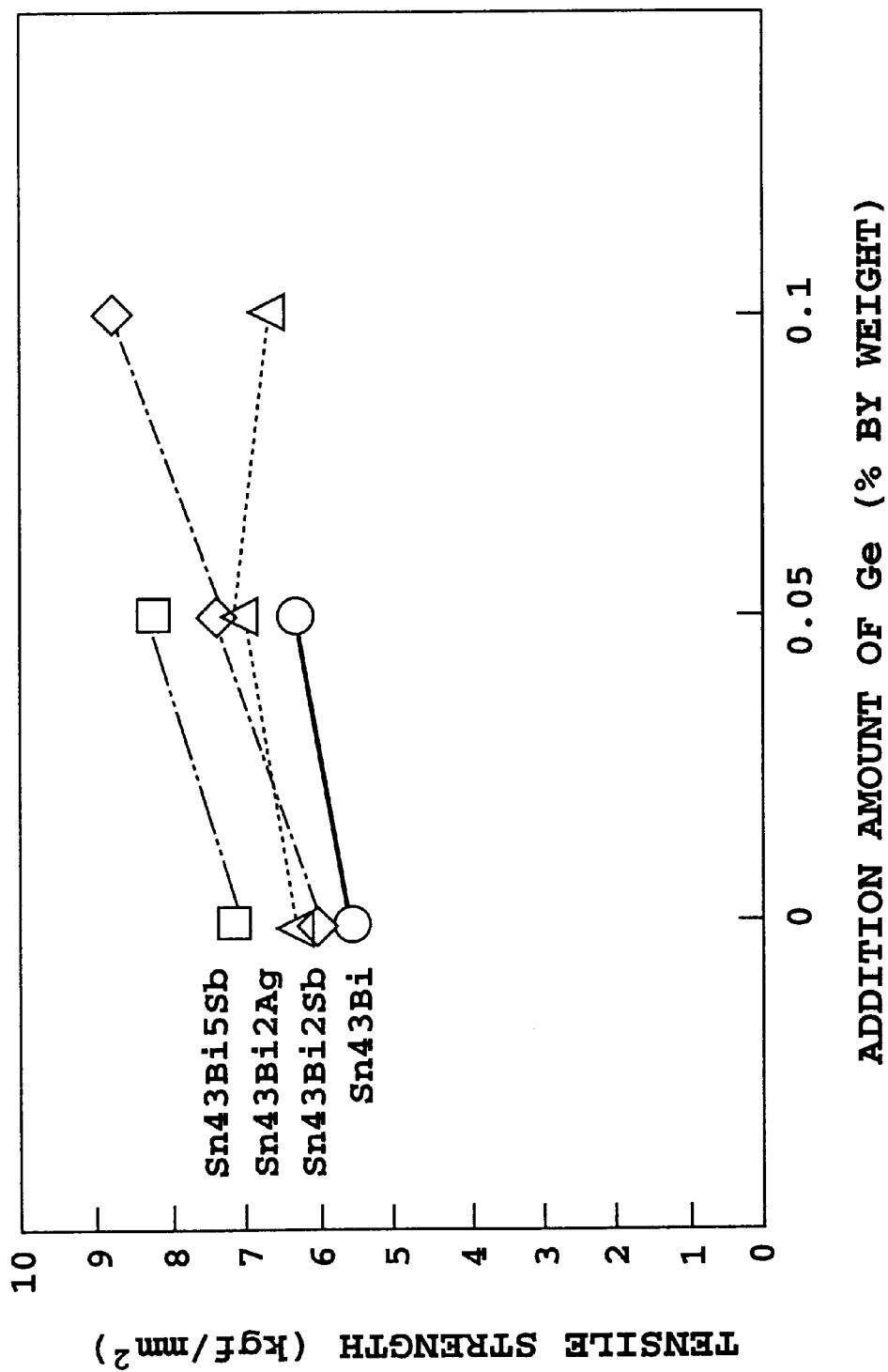
FIG. 2 is a graph showing the dependence of a tensile strength of Sn—Bi alloy (43% by weight of Bi) on the addition amount of Ge.

FIG. 2 is a graphical representation of the Ge-content (wt %) dependence of tensile strength of the Sn—Bi type alloys (Bi-content: 43% by weight) in accordance with the present invention.

A tensile strength of the alloy is measured using a test piece with a diameter of 3 mm and a tension speed of 0.2 percent per second at a room temperature. As shown in the figure, the tensile strength can be increased by adding Sb, Ag, and Ge in the Sn—Bi alloy composition (Bi-content: 43% by weight). An addition of Ge prevents oxidation of Sn. That is, 0.05% by weight of Ge is added into the alloy composition (Sn43Bi) including 43% by weight of Bi in addition to Sn as a main component leads to increase in the tensile strength. In an analogous fashion, other alloy compositions (i.e., Sn43Bi2Ag including 43% by weight of Bi and 2% by weight of Ag; and Sn43Bi5Sb including 43% by weight of Bi and 5% by weight of Sb, in addition to Sn as a main component) lead to increase in their tensile strengths. If 0.1% by weight of Ge is added into each one of the above alloy compositions, it leads to increase in the strength of the alloy containing Sb but it leads to decrease in the strength of the alloy containing Ag because it reaches a level of saturation.

Figure 3:
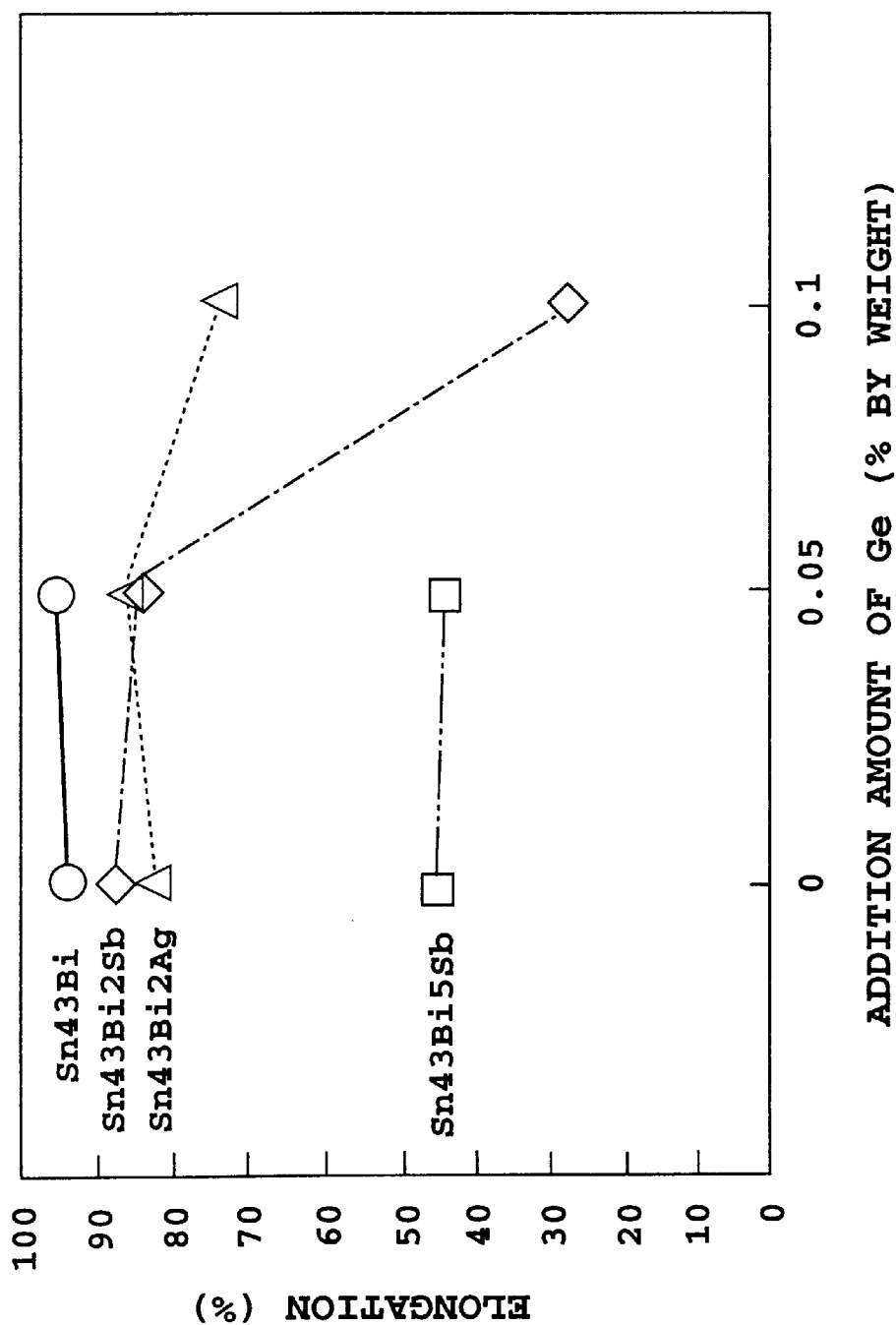
FIG. 3 is a graph showing the dependence of an elongation (%) of Sn—Bi alloy (43% weight of Bi) on the addition amount of Ge.

FIG. 3 is a graphical representation of the Ge-content (wt %) dependence of tensile strength of the Sn—Bi type alloys (Bi-content: 43% by weight) in accordance with the present invention.

An elongation percentage of the Sn—Bi alloy (Bi-content: 43% by weight) can be decreased by adding Sb, Ag, and Ge. If the Ge-content is increased from 0.05% by weight to 0.1% by weight, an elongation percentage of the alloy containing Sb becomes lower than that of the alloy containing Ag. In this case, however, it can be used satisfactorily even though it shows 30% elongation when the Ge-content is 0.1% by weight.

Figure 4:
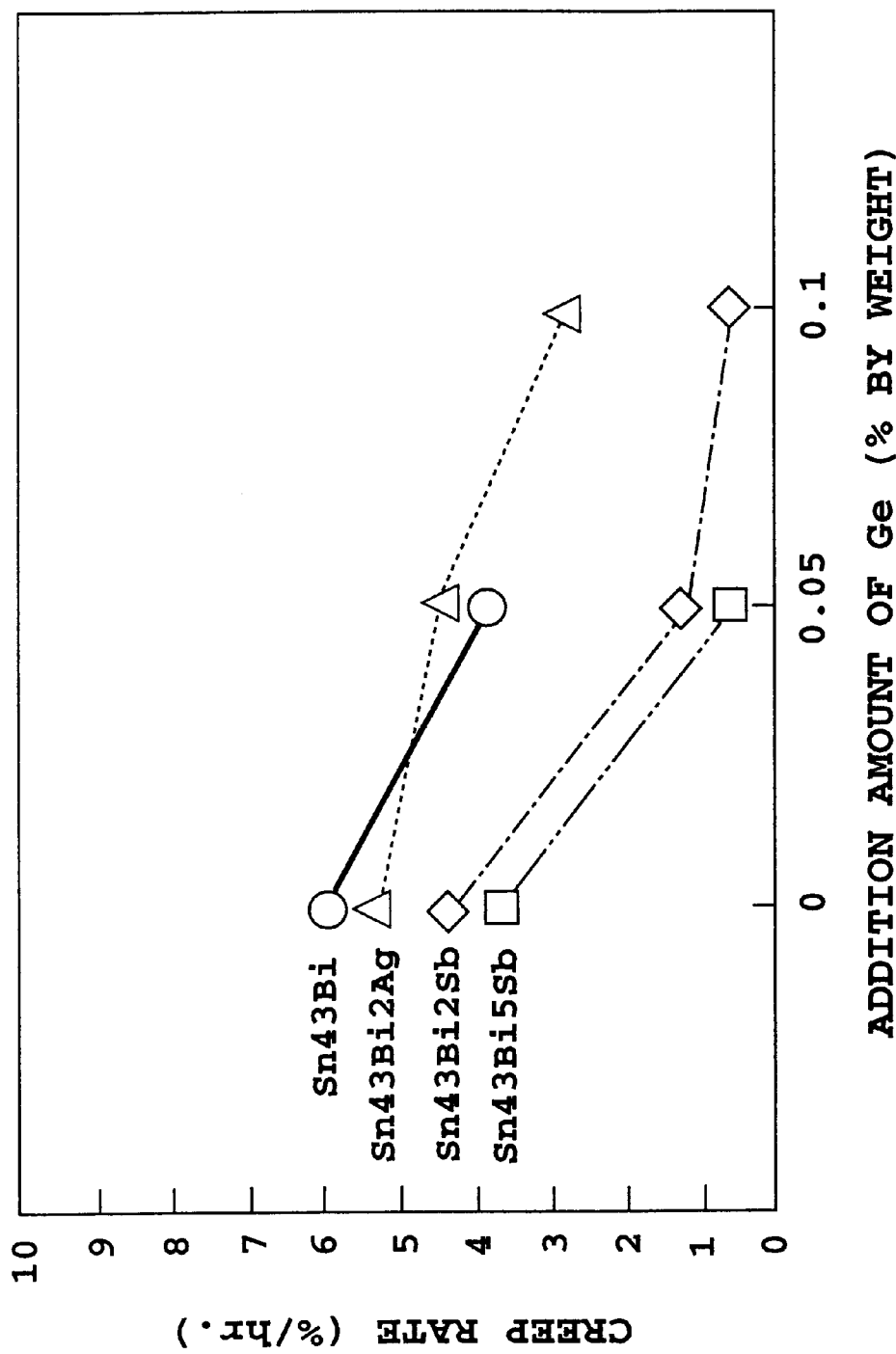
FIG. 4 is a graphical representation of the Ge-content dependency of a creep rate at a temperature of 100° C. for a tin-bismuth (Sn—Bi) type alloy (Bi-content: 43% by weight) of the present invention.

Next, we investigated a creep disformation resistance that is a representative characteristic of the alloy with respect to thermal strength. FIG. 4 is a graphical representation of the Ge-content dependency of a creep rate at a temperature of 100° C. for a tin-bismuth (Sn—Bi) type alloy (Bi-content: 43% by weight) of the present invention. Even though the alloy (Sn43Bi) containing 43%, by weight, of Bi in addition to Sn as a main component and the alloy (Sn43Bi2Ag) containing 43% by weight of Bi and 2% by weight of Ag in addition to Sn show almost the same creep deformation resistance, each of them shows decrease in a creep rate (that is, increase in a creep deformation resistance) by the addition of Ge. The creep rate becomes less as the amount of Ge is increased from 0.05% by weight to 0.1% by weight, resulting in an increase in the creep deformation resistance. As is evident from the above description, the addition of Ge has the effect of increasing the creep deformation resistance. It is noted that the following facts also became evident. That is, each of the alloy (Sn43Bi2Sb) comprising 43% by weight of Bi and 2% by weight of Sb in addition to Sn as a main component and the alloy (Sn43Bi5Sb) comprising 43% by weight of Bi and 5% by weight of Sb in addition to Sn has its creep rate which is lower than that of the alloy (Sn43Bi2Ag) comprising 43% by weight of Bi and 2% by weight of Ag in addition to Sn. In this case, furthermore, the addition of 0.05% by weight of Ge in these alloys has the effect of lowering their creep rates. However, each of the alloys (Sn43Bi2Sb and Sn43Bi5Sb) is noticeably more effective than the alloy (Sn43Bi2Ag) comprising 43%, by weight, of Bi and 2%, by weight, of Ag in addition to Sn. The alloy (Sn43Bi2Sb0.05Ge) comprising 43%, by weight of Bi; 2%, by weight, of Sb; and 0.05%, by weight, of Ge in addition to Sn or the alloy (Sn43Bi5Sb0.1Ge) comprising 43%, by weight, of Bi; 5%, by weight, of Sb; and 0.1%, by weight, of Ge provides an alloy having an excellent creep deformation resistance as a result of an excellent synergy between Sb and Ge in the composition.

FIG. 5 is a graphical representation of the thermal dependency of a creep rate at a temperature of 100° C. or 120° C. for a tin-bismuth (Sn—Bi) type alloy (Bi-content: 43% by weight) of the present invention in addition to that of the Sn—Pb alloy.

For estimating a thermal strength of the alloy, a creep test is performed by using a test piece with a diameter of 3 mm.

Each of alloys having the following compositions show similar tendencies for the thermal creeping effect to increase The following table shows the results of measuring tensile strength, elongation, creep deformation resistance, and wettability of the alloys such as Sn22Bi type, Sn43Bi type and Sn58Bi.

| Composition | Initiation of Solidification/Solid Phase (° C.) | Tensile Strength (Kg/mm$^2$) | Elongation (%) | Creep Rate (%/hr. at 100° C.) | Wettability (mN at 230° C.) |
|---|---|---|---|---|---|
| Sn22Bi | 202/138 | 8.3 | 38 | 2.2 | — |
| Sn22Bi2Ag0.2Ni | 194/136 | 6.4 | 2.4 | — | 1.23 |
| Sn30Bi | 190/138 | 7.3 | 61 | 3.2 | 0.89 |
| Sn30Bi2Ag | 184/137 | 8.0 | 51 | — | — |
| Sn43Bi | 167/139 | 5.5 | 93 | 6.0 | 0.91 |
| Sn43XBi1Ag | 158/135 | 5.9 | 79 | — | — |
| Sn43Bi2Ag | 160/136 | 6.0 | 84 | 5.4 | 1.08 |
| Sn43Bi5Ag | 159/138 | 6.2 | 79 | — | — |
| Sn43Bi2Ag0.05Ge | 161/138 | 7.0 | 86 | 4.5 | 1.2 |
| Sn43Bi2Ag0.1Ge | 162/138 | 6.6 | 73 | 2.9 | — |
| Sn43Bi2Ag0.5Cu0.1Ni | 160/138 | 7.5 | 70 | 4.5 | 0.99 |
| Sn43Bi2Ag0.5Cu0.1Ni0.05Ge | 159/138 | 6.7 | 58 | 4.2 | 1.21 |
| Sn43Bi2Sb | 182/141 | 5.9 | 87 | 4.3 | 0.76 |
| Sn43Bi2Sb0.1Ni | 175/140 | 6.2 | 2.9 | — | — |
| Sn43Bi2Sb0.5Cu0.1Ni | 173/140 | 9.1 | 39 | — | — |
| Sn43Bi2Ag2Sb | 173/140 | 9.3 | 41 | 5.2 | 0.92 |
| Sn58Bi | 139 | 8.4 | 35 | 3.3 | 0.75 |
| Sn58Bi2Ag | 139 | 7.0 | 49 | 2.7 | 0.82 |
| Sn58Bi2Ag0.05Ge | 140/138 | 6.5 | 46 | 2.3 | 1.02 |
| Sn58Bi2Ag0.5Cu0.1Ni | 143/138 | 5.9 | 63 | 1.9 | 0.93 |
| Sn58Bi2Ag0.5Cu0.1Ni0.05Ge | 140/136 | 6.1 | 59 | 1.0 | 1.08 |

(i.e., it deforms with time under stress at elevated temperatures in an analogous fashion). These alloy compositions are: an alloy composition (Sn43Bi) including 43% by weight of Bi in addition to Sn; an alloy composition (Sn43Bi2Sb) including 43% by weight of Bi and 2% by weight of Sb in addition to Sn; an alloy composition (Sn43Bi2Sb0.05Ge) including 43% by weight of Bi, 2% by weight of Sb, and 0.05% by weight of Ge in addition to Sn; and an alloy composition (63Sn37Pb) including 37% by weight of Pb. Furthermore, the Sn43Bi2Sb shows a stable creep deformation resistance at temperatures of 100 to 120 C. The Sn43Bi2Sb0.05Ge shows almost the same thermal creeping effect as that of the 63Sn37Pb. When Sb and Ge are added in an alloy composition (Sn30Bi) including 30% by weight of Bi in addition to Sn and in an alloy composition (Sn58Bi) including 58% by weight of Bi in addition to Sn, the same thermal creeping effects are measured as the case of the alloy Sn43Bi.

Consequently, a tin-bismuth (Sn—Bi) type low-temperature solder alloy having a high creep distortion resistance as a high thermal strength and ductility can be obtained by adding silver and germanium, or antimony and germanium in the Sn—Bi type alloy comprising 30 to 58%, by weight, of bismuth in addition to tin as its primary component. Especially, a solder alloy having an excellent creep deformation resistance can be obtained by adding antimony and germanium in that alloy.

EXAMPLES

A measurement of tensile strength was performed using a test piece with a diameter of 3 mm under the condition of a pulling rate of 0.2%/sec. at a room temperature. For estimating heat resistance, a test piece with the same shape was used and its creep deformation resistance measured at a load stress of 0.2 kg/mm$^2$. A wettability of the test piece was also estimated using a meniscograph method.

As shown in the table, the Sn43Bi2Ag alloy which is prepared by adding 2% by weight of Ag into the Sn43Bi alloy attains improvements in tensile strength, heat resistance (creep deformation resistance), and wettability, compared with those of the Sn43Bi alloy. An improvement in heat resistance can be recognized by the fact that the creep rate becomes low.

Comparing with Sn43Bi2Ag, the Sn43Bi2Ag0.05Ge alloy which is prepared by adding 0.05% by weight of Ge into the Sn43Bi2Ag alloy attains an improvement in wettability and also excellent improvements in tensile strength and heat resistance (creep deformation resistance). In spite of expectations that heat resistance of the Sn43Bi alloy would be increased by the addition of Ni into the alloy on the ground that Ni shows resistance to oxidation at a high melting point, a drop-off of the ductility thereof is observed for the reason that Ni and Bi may form an intermetallic compound. Thus, this leads to the conclusion that the addition of Cu, which forms a solid solution in conjunction with Ni, can be effective to obtain an alloy having improved properties of heat resistance and so on. By adding 0.1 wt % of Ni and 0.5 wt % of Cu in the alloy of Sn43Bi results in an improved alloy having excellent properties of tensile strength and heat resistance (creep deformation resistance) without impairment of the ductility. In this case, a wettability of such an alloy slightly decreases with an acceptable level thereof. It has also been found that the same effects can be attained by adding Cu and Ni into the Sn43Bi alloy having 2% by weight of Ag, 2% by weight of Sb, or 2% by weight of Ag, and 2% by weight of Sb.

Furthermore, our inventive studies reveal that the addition of Ge into the alloy is effective for an improvement in the wettability. For example, Sn43Bi2Ag alloy that contains 0.05% by weight of Ge shows improved properties of tensile strength and heat resistance (creep deformation resistance) in addition to wettability, compared with those of an alloy which does not contain Ge. In addition, the same kind of effects can be also attained by adding 0.1 or less % by weight of Ge into Sn43Bi alloy with Sb or with Sb and Ag. Furthermore, the alloy of Sn43Bi2Ag0.5Cu0.1Ni0.05Ge which includes 0.05% by weight of Ge shows almost the same level of wettability as that of the above Sn43Bi2Ag0.05Ge.

Furthermore, the same kind of effects can be also attained by adding 0.1% by weight of Ni, 0.5% by weight of Cu, and 0.05% by weight of Ge into the Sn43Bi2Sb alloy. In a case of the Sn43Bi including 2% by weight of Ag and 2% by weight of Sb, the addition of 0.1% by weight of Ni, 0.5% by weight of Cu, and 0.05% by weight of Ge into such a alloy results in good effects.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A lead-free solder alloy consisting essentially of, in weight % based on the total amount of the alloy composition:

$30 \leq Bi \leq 58$;

$0 < Ge \leq 0.1$; and the balance Sn.

2. A lead-free solder alloy consisting essentially of, in weight % based on the total amount of the alloy composition:

$30 \leq Bi \leq 58$;

$0 < Ge \leq 0.1$;

at least one component selected from the group consisting of $0 < Ag \leq 5$; and $0 < Sb \leq 5$; and the balance Sn.

3. A lead-free solder alloy consisting essentially of, in weight % based on the total amount of the alloy composition:

$30 \leq Bi \leq 58$;

predetermined amounts of nickel and copper; and the balance Sn, wherein wettability is enhanced by adding nickel and copper.

4. The lead-free solder alloy of claim 3, wherein, the amount of nickel is $0 < Ni \leq 0.2$; and the amount copper is $0 < Cu \leq 1$.

5. A lead-free solder alloy comprising, in weight % based on the total amount of the alloy composition:

$30 \leq Bi \leq 58$;

predetermined amounts of nickel and copper; and at least one component selected from the group consisting of $0 < Ge \leq 0.1$, $0 < Ag \leq 5$; and $0 < Sb \leq 5$; and the balance Sn, wherein wettability is enhanced by adding nickel and copper.

6. The lead-free solder alloy of claim 5, wherein, the amount of nickel is $0 < Ni \leq 0.2$; and the amount copper is $0 < Cu \leq 1$.

* * * * *